US007610207B2

(12) United States Patent  (10) Patent No.: US 7,610,207 B2
Heins                                 (45) Date of Patent:     Oct. 27, 2009

(54) METHOD FOR PROCESSING A DIGITAL IMAGE TO SATISFY A FULFILLMENT REQUEST

(75) Inventor: Douglas B. Heins, San Francisco, CA (US)

(73) Assignee: ZeroTouchDigital, San Francisco, CA (US)

( * ) Notice: Subject to any disclaimer, the term of this patent is extended or adjusted under 35 U.S.C. 154(b) by 350 days.

(21) Appl. No.: 10/733,830

(22) Filed: Dec. 10, 2003

(65) Prior Publication Data

US 2005/0131767 A1   Jun. 16, 2005

(51) Int. Cl.
     *G06Q 99/00*    (2006.01)
(52) U.S. Cl. .............................. 705/1; 705/26
(58) Field of Classification Search ........... 705/26, 705/27, 1
     See application file for complete search history.

(56) References Cited

U.S. PATENT DOCUMENTS

| 5,754,924 | A | 5/1998 | Yamada et al. |
| 6,017,157 | A | 1/2000 | Garfinkle et al. |
| 6,324,521 | B1 | 11/2001 | Shiota et al. |
| 7,013,288 | B1 * | 3/2006 | Reifel et al. ................... 705/26 |
| 7,363,235 | B2 * | 4/2008 | Urabe et al. .................... 705/1 |
| 2001/0044747 | A1 * | 11/2001 | Ramachandran et al. ...... 705/16 |
| 2001/0049640 | A1 | 12/2001 | Kurokawa et al. |
| 2002/0065741 | A1 * | 5/2002 | Baum ........................... 705/26 |
| 2002/0186319 | A1 | 12/2002 | Whitby et al. |
| 2003/0038882 | A1 * | 2/2003 | Chauvin et al. .......... 348/207.1 |
| 2003/0069809 | A1 * | 4/2003 | von Rosen et al. ............. 705/26 |
| 2003/0200099 | A1 * | 10/2003 | Mauro et al. .................... 705/1 |
| 2003/0229536 | A1 * | 12/2003 | House et al. ................... 705/10 |
| 2004/0171371 | A1 * | 9/2004 | Paul ......................... 455/414.4 |
| 2004/0218045 | A1 * | 11/2004 | Bodnar et al. ............. 348/207.1 |
| 2005/0004978 | A1 * | 1/2005 | Reed et al. .................... 709/203 |
| 2005/0097173 | A1 * | 5/2005 | Johns et al. ................... 709/206 |
| 2005/0225799 | A1 * | 10/2005 | Berarducci et al. .......... 358/1.15 |

OTHER PUBLICATIONS

Wang, Dongyan (1998). Two new image processing algorithms and a framework for Internet-based image processing. Ph.D. dissertation, The University of Wisconsin—Milwaukee, United States—Wisconsin. Retrieved Aug. 28, 2009 via ProQuest.*
International Search Report PCT/US2004/041207 dated Oct. 30, 2006.

* cited by examiner

*Primary Examiner*—Jeffrey A. Smith
*Assistant Examiner*—Michael A. Misiaszek
(74) *Attorney, Agent, or Firm*—Perkins Coie LLP

(57) ABSTRACT

The present invention enables a user to download digital photography images and fulfill digital photography requests through a variety of digital photography systems and methods. One digital photography system of the present invention includes a first computing environment for initiating digital photography order requests. The first computing environment receives a download of digital photography images from a user together with an order request from the user. Resident within the first computing environment is a provisioner related to the user, and storing user profile information, user personalization information, and user customization information. This provisioner utilized in fulfilling said order request in a manner personalized to said user. The digital photography system also includes a second computing environment for fulfilling the order request by way of an order fulfillment device.

18 Claims, 7 Drawing Sheets

METHOD FOR PROCESSING A DIGITAL IMAGE TO SATISFY A FULFILLMENT REQUEST

BACKGROUND OF THE INVENTION

1. Field of the Invention

The present invention relates generally to digital photography. More specifically, the present invention teaches a variety of computer methods and systems for placing a digital photography processing or fulfillment order over the Internet, from any geographical location to any other geographical location, allowing for personalized and customized processing of such order. In so doing, the present invention provides a digital photography process as simple as traditional photography, decoupling the user from hardware and software application specifics associated with processing and fulfillment systems of the prior art.

2. Description of the Related Art

Traditional photography has evolved to a point where a consumer is provided a simple, convenient and straightforward system which in line with the consumer's needs. The typical traditional photography system involves a film-based camera, a roll of film, and a convenience store for dropping off film and taking delivery of final fulfillment. The user of traditional film has only four choices to consider from start to finish, namely: 1) buy film; 2) take pictures; 3) drop off film; 4) take fulfillment. The user of traditional photography does not have to concern themselves with the science of emulsions or toners and developers. The science of film processing is made transparent to the user of traditional film photography.

In contrast to traditional photography, digital photography involves a complicated system and process. The typical digital photography system requires a digital camera device, a digital media memory card, a computer for uploading digital pictures from the digital camera, software shipped with the digital camera or ancillary software purchased to manipulate and enhance the digital pictures, an ISP connection to the Internet, a web browser for online web services, and perhaps a local printer. The current art requires the user to acquire knowledge for discovering and locating online fulfillment services as well as knowledge about digital imaging science for manipulating and submitting digital pictures for processing in general. Digital photography processing and fulfillment order in the present art is not user friendly.

One significant problem with existing prior art products in the digital photography marketplace is that these solutions individually or as a group do not offer an "anywhere, anytime or anyplace" consumer utility. While these devices may be suitable for the particular purpose to which they address, they are not as suitable for making digital photography as simple as traditional photography. Furthermore, the digital nature of the architecture of this invention opens up other workflow opportunities, which is the fundamental basis of this invention.

Current prior art solutions are have four fundamental flaws: 1) they are isolated resources of information and services; 2) they offer only fixed semantics; 3) they are passive computing environments; 4) they are composed of idle structure. As isolated resources of information and services, there are little to no relationships created or information exchanged among digital photography commonality and/or mediated service opportunities in different resources such as processing and fulfillment sites, etc. Each resource is accessed within private and proprietary means, limiting user choice of various forms of combining processing and fulfillment options.

As fixed semantics, digital photography is interpreted and processed initially by the vendor's perspective (software, hardware, or web services), and do not necessarily reflect the evolving semantic expectations of users. As idle structure, relationships between digital photographs from a single-event session, statistical analysis, EXIF tags, and information patterns are not utilized. Different kinds of structural relationships are available, but not typically used within the prior art.

These missing components of the prior art lead to fundamental system flaws preventing different opportunities of coupling computing devices and resources with user goals and expectations. These is little, if any, system-to-user co-adaptation and learning capabilities, because inherently passive-environments and relatively static idle-structures are unable to pro-actively push relevant information to user and in between relevant computing resources; this precludes any ability to make "recommendations".

Furthermore, because of the passive environment and isolated nature of the computing resources, there is no relevant mechanism to exchange knowledge, or crossover of relevant information among users and in between relevant computing resources; this precludes any ability to form "conversation" between interested physical or computing resources. Worse yet, the fixed semantics eliminate or severely limit the ability to recombine knowledge and information to infer new methods and processes for achieving digital photography processing and fulfillment; this precludes any ability to explore "creativity", eliminating the ability of the system to evolve with "emergent properties and behaviors".

What are needed are techniques and mechanisms allowing the digital photography experience to have the same transparent ease of use known in traditional film photography. Ideally the user of the digital photography system would allow a user to create photographs with the same four steps (assuming digital camera and digital media memory card are already purchased) found in traditional photography, namely: 1) take pictures; 2) find entry point into the system embodied by this invention; 3) modify their personalization and customization (this is optional if the user uses the defaults they established during subscription/registration) if desired, and 4) take delivery of final fulfillment.

BRIEF DESCRIPTION OF THE DRAWINGS

Various other objects, features and attendant advantages of the present invention will become fully appreciated and better understood when considered in conjunction with the accompanying drawings, in which like reference characters designate the same or similar parts throughout the several views, and wherein.

DETAILED DESCRIPTION OF THE INVENTION

Figure 1:
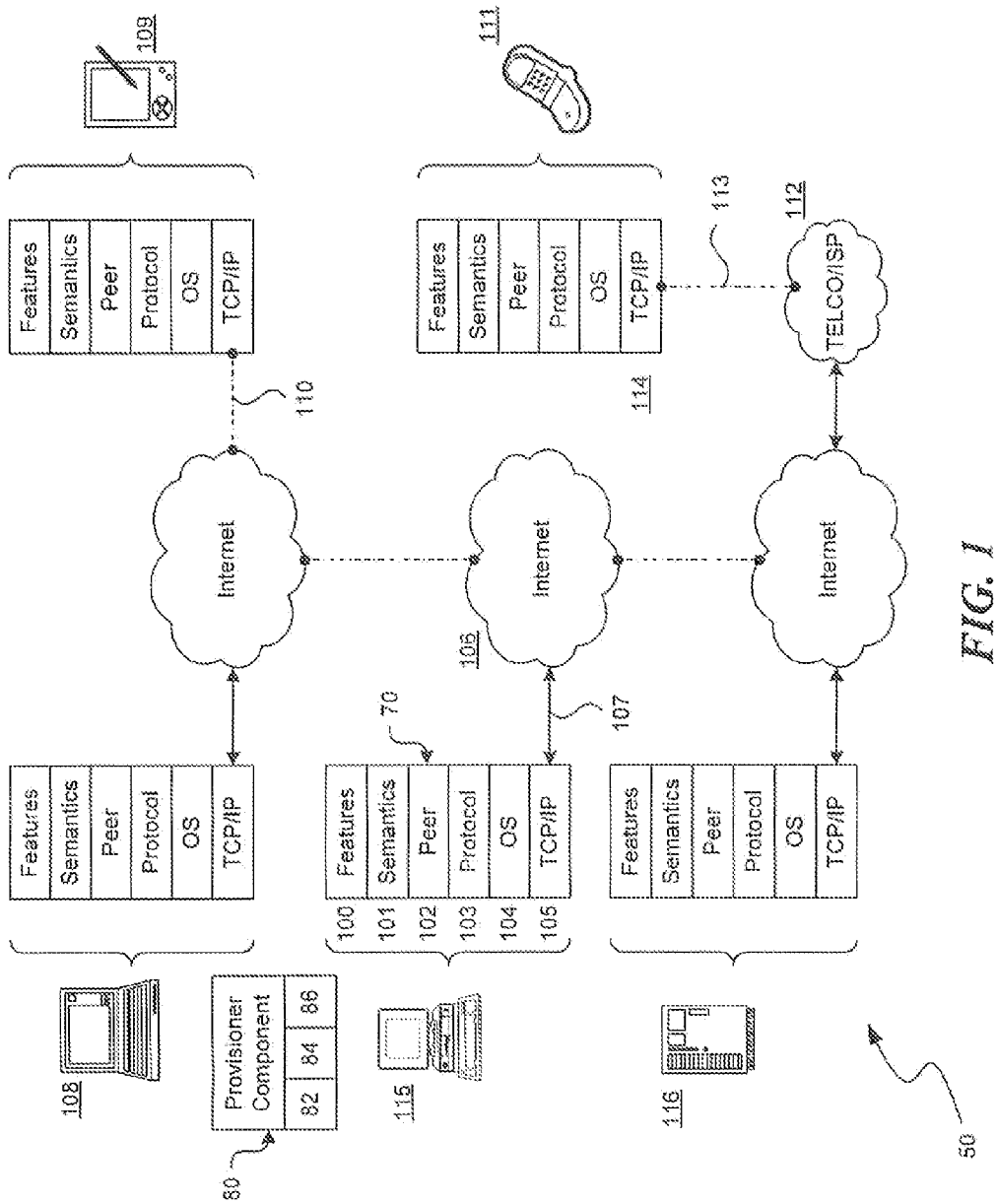
FIG. 1 is a diagram of the plurality of computing devices which encompasses the scope of this invention.

The present invention provides a host of methods and systems for digital photography processing and fulfillment via a communication network wherein the same can be utilized for making digital photography as simple as traditional photography. The present invention teaches a scale-free network of computing hardware resources each capable of providing one or more customized execution behaviors and a virtualized user provisioner whose goal is to achieve a final or intermediate fulfillment order objective. The present invention allows the user to focus on taking pictures, finding an entry point into an embodiment of this present invention, with the rest of the experience being similar to traditional film processing and fulfillment, with improved digital features and capabilities.

The present invention further recognizes the value proposition for the client side as well as the computing device and computing resource side of system components. The user personalization and customization allows for new patterns and relationships to form of the various components with form the solution of the user. This ability to adapt both the user-to-system level components as well as the device-to-resources level of components brings a level of "personality" to the system which creates a familiar feel and user interaction; this is crucial for eliminating the traditional computing interaction from the model. Furthermore, the current invention is "conversational" as there is multi-directional dialog between all aspects of the system, allowing all components to potentially learn new information in a pro-active adaptive fashion.

The present invention contemplates a "pro-active environment" of different interactions between user-to-system and system-to-devices-to-resources capable of recommending information relevant to the user's particular goals and expectations. The current invention explores, creates and exploits "structural patterns" that go well beyond the idle structures of prior art, creating "dynamic relationships". The current invention establishes "evolving semantics" as the system adapts to new users and new vendors of services and resource capabilities. New concepts are introduced from the crossover of information from multiple sources creating a system with "emergent properties and behaviors".

Fundamentally, prior art solutions are limited in their ability to deliver solutions which are greater than the sum of their individual components; this is their fundamental weakness as change is the only constant in the business world, and prior art solutions are incapable of dynamic change, or at least at the pace required by the marketplace. The present invention provides an evolving system of resources and computing devices, whose overall system "wholeness" is always greater than the sum of its components. The current invention creates an evolving semantic environment of "emergent properties and behaviors" allowing for evolving and adaptive solutions to be delivered as change is fundamentally inherent in its architecture.

Below are now listed several embodiments of the present invention. Those skilled in the art will appreciate that these embodiments are merely for example and by no means define the bounds of the invention.

1. A client device whereby a processing and fulfillment order is placed by a user and received by a plurality of processing and fulfillment components in the system.
2. A process by which users take digital photographs captured with a digital camera, and with the single-event instantiation of an automated process begin, complete, and verify the following:
   a secure and encrypted download of the photographs to an appropriate processing and fulfillment location
   a selection of fulfillment either geographically local or remote with respect to user location
   a storage and job queue management of the dynamic processing workflow to the final fulfillment location
   a conversion of the digital photographs into the appropriate fulfillment format(s) automatically according to user preference and personalization
   a notification of job completion via a plurality of different communication methods
3. A process by which users initiate digital camera picture transfer using one of the following:
   a direct hardware cable connection to the client device
   a direct connection to the removable digital media memory card via a receptacle cable or other form of a physical adapter
4. A process by which a user of the said system does not need to explicitly identify themselves when placing an order, using instead one of the following:
   user email address (actual or synthetic) and passcode
   text string and passcode
   a smart-card and pin
   a biometric reader
   this can be referred to a credit-card, in-system account, or a bank account
   user can "spend" from a pre-established account (e.g. $50 increments)
   user can be billed in monthly subscriptions
5. A process by which the download of digital photographs is associated with a single-event user provisioner, and validates the following:
   a user has a valid subscription
   a user is a single user and the information regarding the user is captured dynamically
   a "pre-flight" of the entire workflow to verify and validate that all options are valid and available. No currently available prior art provides pre-flight feedback to the consumer as does with the current invention.
   a presentation of information captured during pre-flight which permitting the user to fine-tune choices and options prior to final commitment
6. A process by which the user is manifested as an RDF/DAML instance called a provisioner, encapsulating the following:
   a user profile manifest
   a user personalization manifest
   a user customization manifest
   dynamically attached content inserted or deleted during execution within the lifecycle of the provisioner
7. A process by which a user profile manifests as a RDF/DAML instance, encapsulating the following:
   a user address
   a user contact information
   a user billing information
8. A process by which a user personalization manifests as a RDF/DAML instance, encapsulating the following:
   a choice of digital photography enhancement
   a choice of automated rendering (ignore over-developed or under-developed photographs or automatic image rotation)
   a choice of digital photography layout a choice of digital photography fulfillment presentation (slides, prints, album)

a preferred means of notification (mobile, PDA, email, web service)

9. A process by which a user customization manifests as a RDF/DAML instance, encapsulating the following:

a physical hardcopy fulfillment a choice of vendor for hardcopy fulfillment a choice of physical pickup of hardcopy fulfillment or other non-physical means of taking delivery 10. A process by which the final provisioner executes upon itself as a distributed workflow, achieving the following:

satisfying runtime constraints and conditions providing feedback notifications as specified and as necessary to achieve final order means to query and traverse the semantic based scale-free network of behaviors the means to match candidate semantics and according to its contents chose the best match to meet user's habits and needs the means to match semantic-content with semantic-behavior and cause execution of behavior on said content 11. A scale-free network topology of computing resources collaborating in a peer-to-peer configuration, supporting the following:

characterization by the autonomy of their programmed behavior dynamics and context-awareness of services and applications they offer ad-hoc interoperability of behaviors and the different modes of user interaction upon those behaviors via the provisioner context-aware and content-oriented interoperability via semantic feature mapping via RDF/DAML instances ability-aware of the presence of other behaviors and provisioners designed in order to be sensitive, adaptive and responsive to the needs and habits of the provisioner providing an invisible interface to behaviors providing for the mediation between the user and digital world via transparent interaction a system whereby, when user registration occurs, the remaining user interaction involves the same familiar steps to operate as associated with traditional film processing and fulfillment.

Turning now to the drawings, in which similar reference characters denote similar elements throughout the several views, the attached FIGS. illustrate a method and system for digital photography processing and fulfillment, which comprises a scale-free network of computing hardware resources each providing customized execution behavior and a user proxy Provisioner whose goal is to achieve a final or intermediate fulfillment order objective satisfying a set of constraints and feedback requirements. Digital photography requires sophisticated hardware technologies and software applications, which often do not work together (even when they do, software versioning can destroy the link). The present invention brings comparable traditional film photography experience to digital photography. The single-action ordering system of the present invention reduces the number of user interactions needed to place a processing and fulfillment order. The present invention reduces the amount of sensitive information that is transmitted between a user and a processing and fulfillment system, while also providing for security and encrypted content throughout the entire processing and fulfillment lifecycle.

Turning directly to FIG. 1, a digital photography system 50 in accordance with one embodiment of the present invention will now be described. The digital photography system 50 is one suitable embodiment for providing digital photography order fulfillment in a manner as efficient and user-friendly as traditional photography systems. The digital photography system 50 includes a plurality of virtual users each represented as a provisional component 80, and a plurality of computing devices such as a personal laptop computer 108, a portable digital assistant (PDA) 109, a desktop computer 115, a mobile radiotelephone computing device 111 and a server computer 116, all coupled bi-directionally via connections 107 through a wide area network such as the Internet 106.

The provisioner component 80 is a virtualized user within the framework of the present invention, e.g., within the digital photography system 50. The provisioner component 80 serves as a proxy for the user and captures three user perspectives with separate data structures, namely: a user profile 82, a user personalization 84, and a user customization 86. This data defines the user sufficiently to provide the desired digital photography services of the present invention, and may be stored and arranged in a variety of ways.

With further reference to the provisioner component, the user profile data 82 represents relatively static information that does not generally affect runtime aspects of the present invention, but does provide information necessary to complete processing and fulfillment orders, some of which include user address, user billing, and user contact. The user personalization data 84 represents specific behavior options chosen a priori by the user, and/or defined by user behavior. These options could include defining which store from a plurality of stores is used to render final hardcopy fulfillment, whether to automatically rotate images based upon statistical methods of determination, whether to skip rendering of images that are either over-developed or under-developed, etc. The user customization data 86 represents the runtime instantiation of network pathways and workflow structures resulting from the specification for a particular processing and fulfillment order objective, for example the user requesting to have hardcopy print as well as VCD media, or a web online album upload and digital picture CD archive.

Next we provide a little more detail related to the hardware of the digital photography system 50. As will be appreciated, the digital photography system 50 of FIG. 1 is simply one suitable configuration; a variety of other configurations contemplated by the present invention would be readily apparent to those skilled in the art. In any event, the personal laptop computer 108, the desktop computer 115 and the server computer 116 are typical computers, each including elements such as a micro-processor, an operating system, resident memory, display screen, physical keypad, hardware plug-ins and either physical or wireless hardware connection to the network.

The laptop computer 108 includes appropriate software for connecting the computing device to the network 106, and may have a java virtual machine (JVM) and support for specific adaptive helper functionality. The server computer 116 may or may not have a keyboard or a display screen attached as it operates as a server and may be managed remotely through other computing devices. Such generic computer based devices are well-known in the art, and will not be described further.

The PDA 109 is one suitable PDA computing devices which includes a micro-processor, an operating system, resident memory, display screen, physical or touch screen keypad, hardware plug-ins and either physical or wireless hardware connection to the network. The PDA 109 includes appropriate software for connecting the computing device to the network 106, and typically has a java virtual machine (JVM) and support for specific adaptive helper functionality. The PDA 109 is representative of PDA based devices connected through a bi-directional wireless channel 110, one of which includes the 802.11 protocol. Such PDA computing devices are well-known in the art, and will not be described further.

The mobile computing device 111 is one possible embodiment of a plurality of mobile radiotelephone computing devices which include a micro-processor, an operating system, resident memory, display screen, physical or touch screen keypad, hardware plug-ins and includes appropriate communication devices and software for connecting mobile computing device 111 to the network 106 through a Telco/ISP relationship 112 and a phone services backbone 113 using telephony services 114 in the operating system. The mobile radiotelephone 111 typically has a java virtual machine (JVM) and support for specific adaptive helper functionality. Such mobile radiotelephone devices are well-known in the art, and will not be described further.

As illustrated with respect to the desktop computer 115, each representative device may be viewed as including a functionality stack 70. The functionality stack is a conceptual representation and includes a features layer 100, a semantics layer 101, a peer layer 102, a protocol layer 103, an OS layer 104, and a TCP/IP layer 105. Layers 103-105 are the common software components which include operating system components specific to a particular device and utility programs that enable the device to perform basic operations (such as storing and retrieving information to and from memory, displaying information on an associated display, performing file operations, and performing I/O operations across a network connection through some well known wire protocol). Such operating features are well-known in the art, and will not be described further.

As defined, the operating system generally provides only very basic functions and must be accompanied by additional application specific behavior. This additional behavior interacts with the operating system to provide much higher level of abstractions between the computing device and the interaction between user and the interaction between behaviors. Layers 100, 101 and 102 provide a plurality of additional functionality and behaviors that extend the low level functionality offered by the operating system. Traditional network connections operate within a client-server mode, the peer layer 102 extends the network model by adding novel semantic-based peer-to-peer connectivity creating a scale-free network of abstracted behaviors. The semantics layer 101 builds upon the semantic peer-to-peer behavioral model providing semantics to the features layer 100. The features layer 100, the semantics layer 101, and the peer layer 102 programmed according to the present invention provide a robust environment for a "zero touch" digital photography experience.

Those skilled in the art will appreciate that the system 50 can be viewed as a scale-free network. The leaf components such as computing devices 108, 109, and 111 of the system 50 represent final terminals within the scale-free network. The node components such as the desktop computer 115 and the server computer 116 can connect to zero or more other nodes or leafs. The combined behaviors of leaves and nodes, as defined in each device's functionality stack 70, forms an overall network whose computing value is derived as an emergent behavior of the system, not an individual leaf or node.

Figure 2:
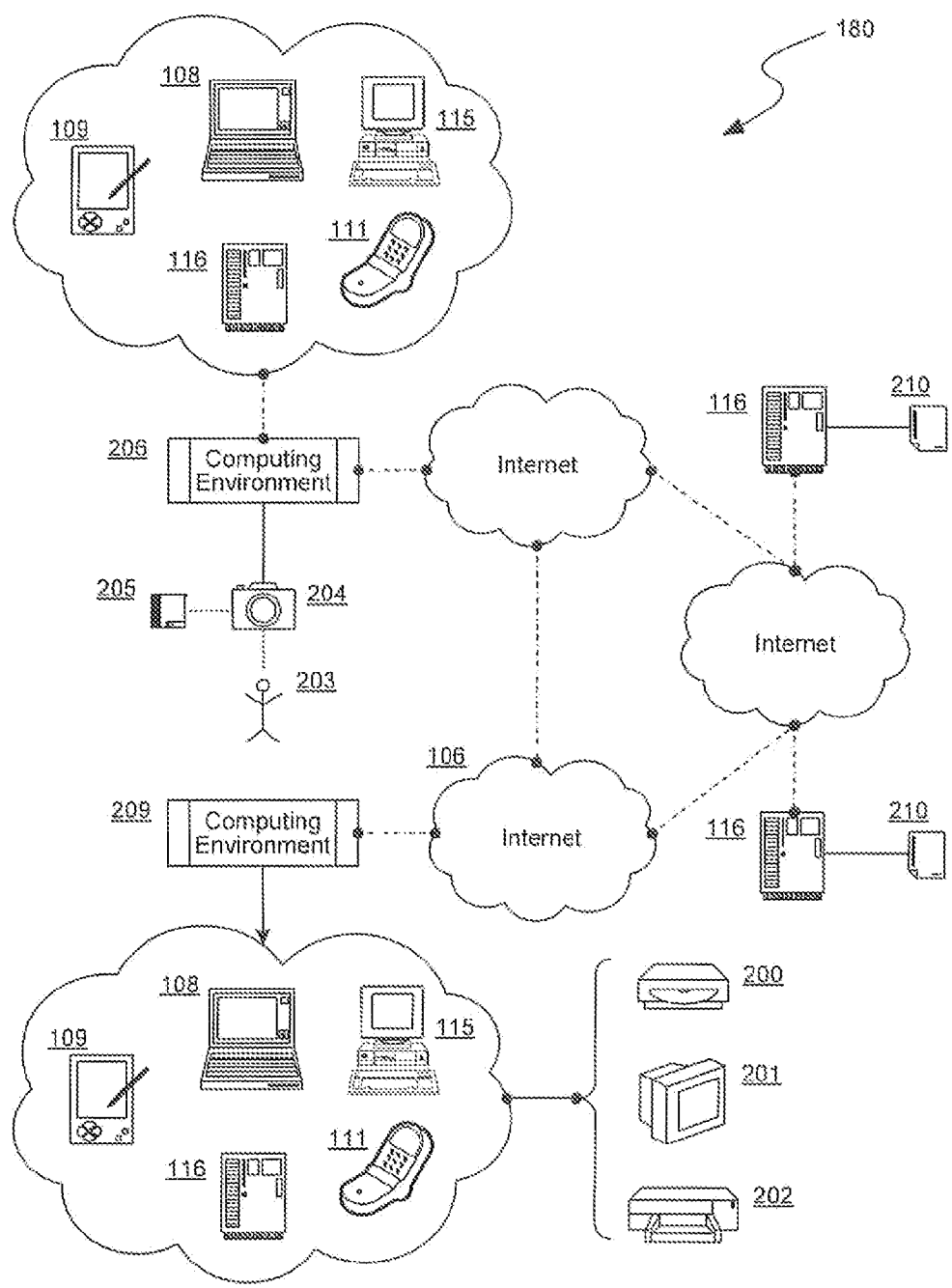
FIG. 2 is a representation of the computing environment that comprises the architecture.

FIG. 2 illustrates a "zero touch" digital photography experience within a digital photography system 180 in a broader architectural context building upon the concepts described above with reference to FIG. 1. The digital photography system 180 includes a user 203, a digital camera 204 typically having expansion memory 205, an order initiation computing environment 206, an order fulfillment computing environment 209, at least one server computer 116, all coupled via a network 106 such as the Internet.

Digital cameras such as digital camera 204 are computing devices that capture and store still and moving images as digital data, as opposed to capturing images on photographic film. The digital camera 204 includes a micro-processor, an operating system of some sort, resident memory, display screen, mechanical navigation and normally an accessory slot for the expansion memory 205. Some suitable expansion memories include CompactFlash, MultiMedia Card, Secure Digital and MemoryStick. Digital camera devices are well-known in the art, and will not be described further.

The order initiation computing environment 206 includes that portion of the digital photography system 180 where the user 203 implements an order for digital photographs. This may take a variety of forms such as a computer kiosk in a photography store or a user's desktop computer, etc. The functionality available should include initiating the process of uploading contents from the digital camera 204, and specifying the order parameters.

The computing environment 206 can provide the mechanisms for uploading the contents of the digital camera. The user 203 may own the devices within each computing environment. However, the user may be in a location remote from the computing devices they personally own. According to the invention, these devices can be co-located in any location and any place in order to achieve the requirement of providing network connectivity and means to initiate the process of digital camera fulfillment. As illustrated, the digital camera 204 can either be directly connected to a computing device, some of which include 108, 115, 116, or the digital memory can be connected to a computing device within the computing environment 206 through associated memory card expansion capabilities.

The computing environment 209 includes that portion of the system providing the user 203 order fulfillment as the result of successful execution of selected operation and behaviors. To accomplish the final step of order fulfillment, the order fulfillment computing environment includes at least one order fulfillment device such as a CD-ROM burner 200, a display 201, and a printing device 202. These are just suitable examples and the typical order fulfillment computing environment will have several such devices available. Of course, order fulfillment may involve receipt of an email with photo attachment or an insertion into a resident photo-album application running a user's computing device.

The present invention tends to satisfy the user's desire to achieve a digital photography experience comparable with traditional film photography. The present invention does just that by enabling the user 203 to receive the benefits of digital camera photography without direct involvement in the process.

The computing devices found within computing environments 206 and 209, as well as the server computers 116, are connected to the Internet through their corresponding network capabilities. This interconnection of devices forms a scale-free network whereby one computing device is reachable from any other computing device. According to the invention, this interconnection of computing devices provides the means of uploading the digital images from the digital media/digital camera 205/204 and routing the digital images through the network to the final fulfillment as illustrated by 200, 201, 202 and 208.

According to certain embodiments of the invention, it is not sufficient to simply "ship" content through the network in order to be a "zero touch" experience for the user 203. Additional content modifications may be made upon the digital images uploaded from the digital media/digital camera 205/204. These additional modifications are made upon the said content through the various servers 116 to which behaviors and features 210 are associated. The behaviors and features 210 represent a plurality of semantic behaviors and features to which the digital image content may be modified in accordance to the end goal of user fulfillment.

According to the invention, the desire of the user 203 from FIG. 2 is to achieve a comparable experience to traditional film photography. The traditional film photography experience can be summarized in 4 simple steps: 1) purchase of film (existence of the camera is assumed); 2) take pictures; 3) drop off film with choice of fulfillment; 4) take delivery of fulfillment selected. According to the invention, a near equivalent experience is afforded the user 203 of the digital camera 204. Actually, after initialization, the current invention removes steps (1) and (3), or greatly simplifies them.

Figure 3:
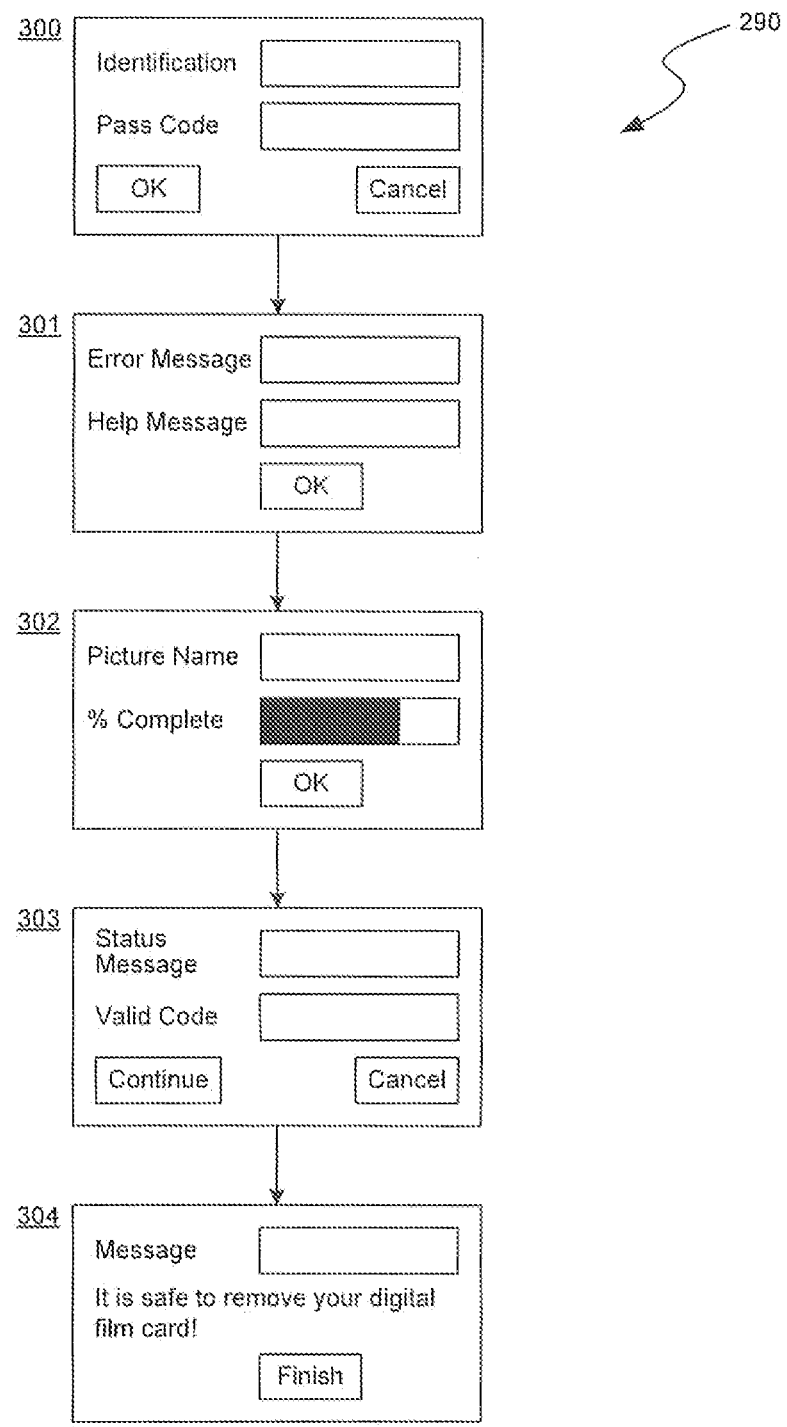
FIG. 3 is a flow diagram of the user interaction dialog forms used to initiate the front end process.

With reference to FIGS. 2 and 3, one suitable method for processing and fulfilling a digital photography request in accordance with one embodiment of the present invention will now be described. As illustrated in FIG. 2, the user 203 initiates the process by taking either the digital camera 204 or the digital media memory card 205 from the camera and attaching either one into the computing environment illustrated by 206. The act of insertion or associating the digital camera 204 or the digital media memory card 205 can be performed by either the user 203 directly, or by an intermediary person/agent whom performs the same interaction process as the proxy for user 203.

Once the digital camera 204 or the digital media memory card 205 is associated with a suitable computing device from within the computing environment 206, the user 203 with a series of electronic sheets as illustrated within FIG. 3.

FIG. 3 illustrates a flow diagram 290 of electronic sheets as one embodiment of the invention. Electronic sheets 300-305 illustrate a series of electronic sheets represented by a standard java virtual machine (JVM) GUI application running on a computing device.

The initial electronic sheet 300 operates to obtain identification and pass code information from the user 203. The identification is simply a unique identifier for the user 203 and can take any suitable form such as a simple string name, an email address, and a coded alphanumeric sequence. One preferred embodiment the user's email address. According to the email address embodiment, when the user 203 does not have an email address, the user will be assigned an email address based on the domain name of their site of registration. The pass code is an electronic sheet protected string that is known only to the user 203. The identification and pass code strings are sufficient mechanisms to uniquely identify and verify the user 203 as a subscriber of the digital photography system 180. The user 203 enters an identification and pass code into the Identification and Pass Code portions of the electronic sheet 300 and selects either the OK button or the Cancel button.

When the Cancel button in electronic sheet 300 is selected, the flow of FIG. 3 transitions to a final electronic sheet 304, where the user is informed to remove or detach their camera 204 or the digital media memory card 205 from the computing environment 206. Pressing Finish in the final electronic sheet 304 will reset the system causing the flow of electronic sheets to return to electronic sheet 300.

Continuing on with the description of FIG. 3, when the OK button in the initial electronic sheet 300 is selected, the method 290 then validates the identification and pass code. When the user 203 is not authorized to utilize the digital photography system 180, an error message is displayed in the Error Message portion of the electronic sheet 301; pressing the OK button transitions to electronic sheet 304 as described earlier. When the user 203 is authorized, flow transitions to the electronic sheet 302 that provides an interactive feedback interface to the user 203. The electronic sheet 302 directly provides for downloading digital image content and provides feedback regarding the transfer/download.

The embodiment of FIG. 3 contemplates providing two types of feedback to the user 203 via the electronic sheet 302. These are 1) the percentage of digital images (i.e. a progress bar) transferred; and 2) the name of the current digital image being transferred. When the data download is concluded, the selects the OK button which transitions the flow to electronic sheet 303.

The electronic sheet 303 illustrates the user receiving Status Message and Valid Code. When all digital images are transferred using electronic sheet 302, the method 290 performs any necessary additional processing such as verifying that the transferred digital images have properly transferred. Once suitable method would be a CRC method of verification. This CRC code is calculated for the entire collection of digital images transferred, and it is displayed as the Valid Code to insure digital content integrity. The Status Message provides information indicating the success of the transfer.

Those skilled in the art will appreciate that a digital photography system of the present invention could include a device from a plurality of printing devices capable of providing physical output of the verification code and configuration information, all of which would be useful for record keeping, while also providing a processing audit trail of the entire process. When 303 is complete, the user can select either the Continue button or Cancel button.

The Continue button in 303 illustrates the user's commitment to proceed with the final stages of the process. Pressing the continue button finalizes the packaging of the digital pictures as associated with the user 203 according to their personalization and preferences. This initiates the zero touch fulfillment process of the invention. The flow transitions to electronic sheet 304, which displays helpful information and indicates to the user 203 that they can detach their digital camera or digital media memory card from the computing environment. Pressing Finish in electronic sheet 304 will reset the system causing the flow of electronic sheets to return to electronic sheet 300.

The Cancel button in 303 illustrates the user's desire to terminate the process, which removes all internal copies of the digital images, and resets the internal state. The flow transitions to electronic sheet 304, where the user 203 is informed to remove or detach their camera 204 or the digital media memory card 205 from the computing environment 206. Pressing Finish in electronic sheet 304 will reset the system causing the flow of electronic sheets to return to electronic sheet 300.

According to one embodiment of the present invention, the downloaded images are not automatically deleted, but are stored as the "state" of this instance to better personalize processing for the user 203 in the future, particularly when the user re-submits the exact digital pictures. Regardless of the choices made during the transition of flows as illustrated in FIG. 3, the user 203 must proactively delete the digital images within the digital camera 204 as contained on the digital media memory card 205. Remember the state of the user's memory offers additional value added over current prior art solutions. For example, a user has a digital media memory card which has room for 50 pictures, 30 pictures and downloads them, and proceeds to take 20 new pictures. The embodiment of this paragraph would remember the 30 pictures already processed, only referencing the new 20 pictures for additional processing and fulfillment.

Figure 4:
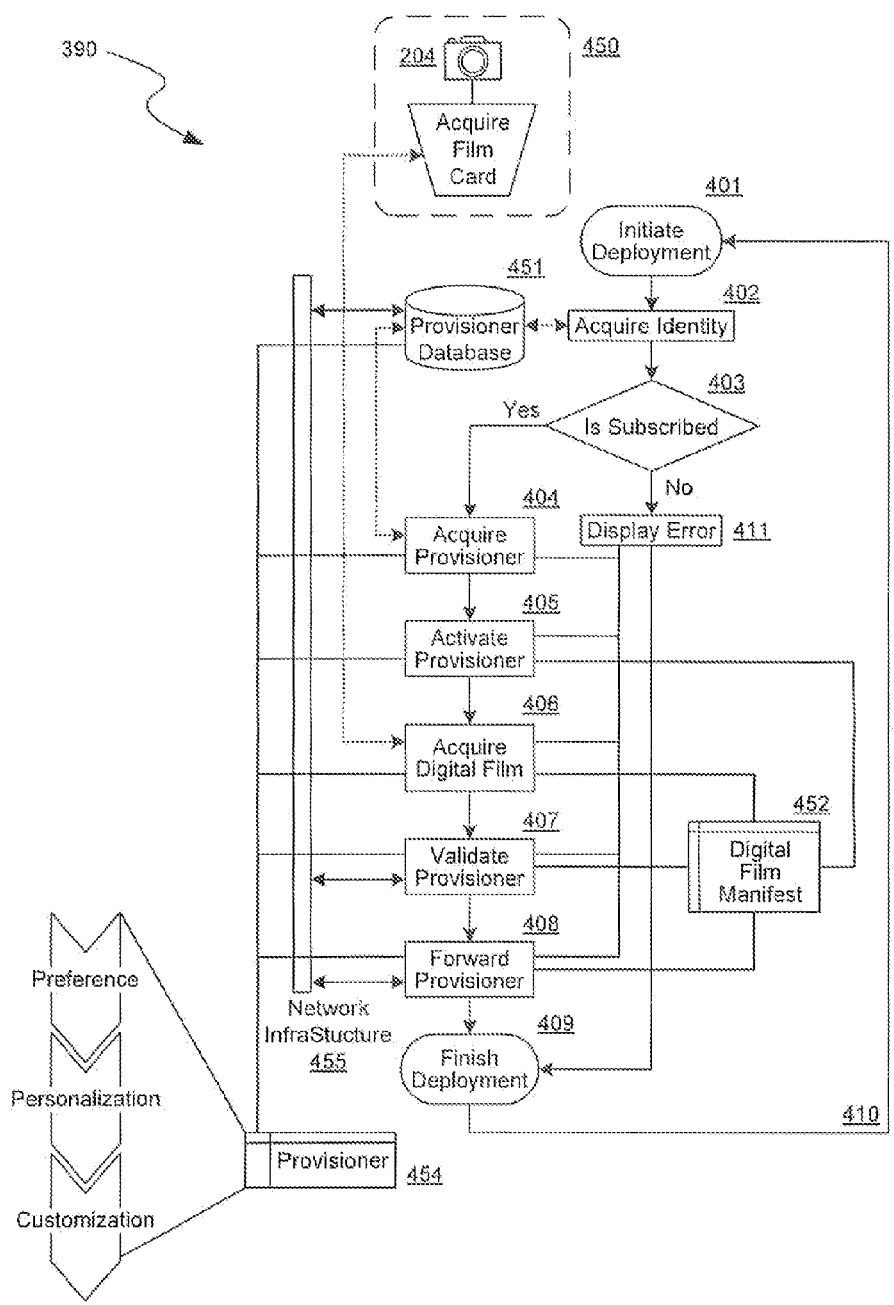
FIG. 4 is a flowchart of the user interaction along with critical components required by this process.

FIG. 4 is a flowchart of a method 390 implementing the mechanisms of the electronic sheets described above in FIG. 3 according to one aspect of the present invention. A first step 401 initiates deployment including coupling of the digital camera 204 or digital media 205 with the computing environment 206, as well as presentation of an electronic sheet 300 to a user of a digital photography system of the present invention. A next step 402 acquires an identity of the user. The step 402 corresponds to the user entering data into the Identification and Pass Code Fields of electronic sheet 300.

A decision step 403 determines whether the user is authorized to utilize the digital photography system. The decision step 402 decides at least in part based on information stored in a Provisioner database 451. The Provisioner database 451 is a local or remote storage representation used to maintain a list of authorized users. This database can be local or can be remote as illustrated via its connection to a network via link 455. The database contains information referred to as a Provisioner 454.

A Provisioner 454 is an electronic proxy of the user 203, containing both active as well as passive information. It contains the user preferences, personalization and customizations used throughout the zero touch experience. Customization is the means whereby computing devices and their interdependencies to other computing devices can be augmented to enhance the experience and objective of the user. Personalization is the means whereby a individual computing devices behavior is further augmented to capture the preferences of the user of said behavior. Customization deals with the interconnection and interdependency among computing devices and personalization deals with capturing the intent and learned experience of the user and imposing that behavior upon the computing devices on behalf of the user. Both customization and personalization as active informational components, and their span of control can effect the entire computing environment and encompassing system. This effect of span of control has the added benefit of capturing emergent properties and behaviors based on the intent and objective of the user. Therefore according to the invention, these two properties implement a critical distinction and direct benefit to the end user 203. Preferences capture static information regarding the user 203.

When the step 403 determines that the user is authorized, flow of the method 390 passes to an acquire provisioner step 404 where the Provisioner 454 corresponding to the user is acquired. In a step 405, the Provisioner 454 is activated meaning that the specifics of the user are brought into play for fulfillment of the digital photography request. For example, activation associates static information with the Provisioner 454 for required processing and future error recovery.

From step 404, control passes to an acquire digital film step 406 which involves download of the digital film and presentation of the electronic sheet 303 to provide user feedback. Likewise during step 405, the downloaded digital information is arranged within the Digital Film Manifest 452, which is associated with the Provisioner 454. A validation step 407 validates that information and content have been acquired correctly and the proper associations have been made across 452 and 454, and additionally displays the electronic sheet 303 to the user. The next step 408 occurs when the user initiates the completion of the process and transitions from electronic sheet 303 to electronic sheet 304, which concludes the user interaction in initiating fulfillment. From this point forward, fulfilling the user's objective is completely automated, other than in a finish deployment step 409 which involves the user collecting the final form of fulfillment at the selected destination.

Figure 5:
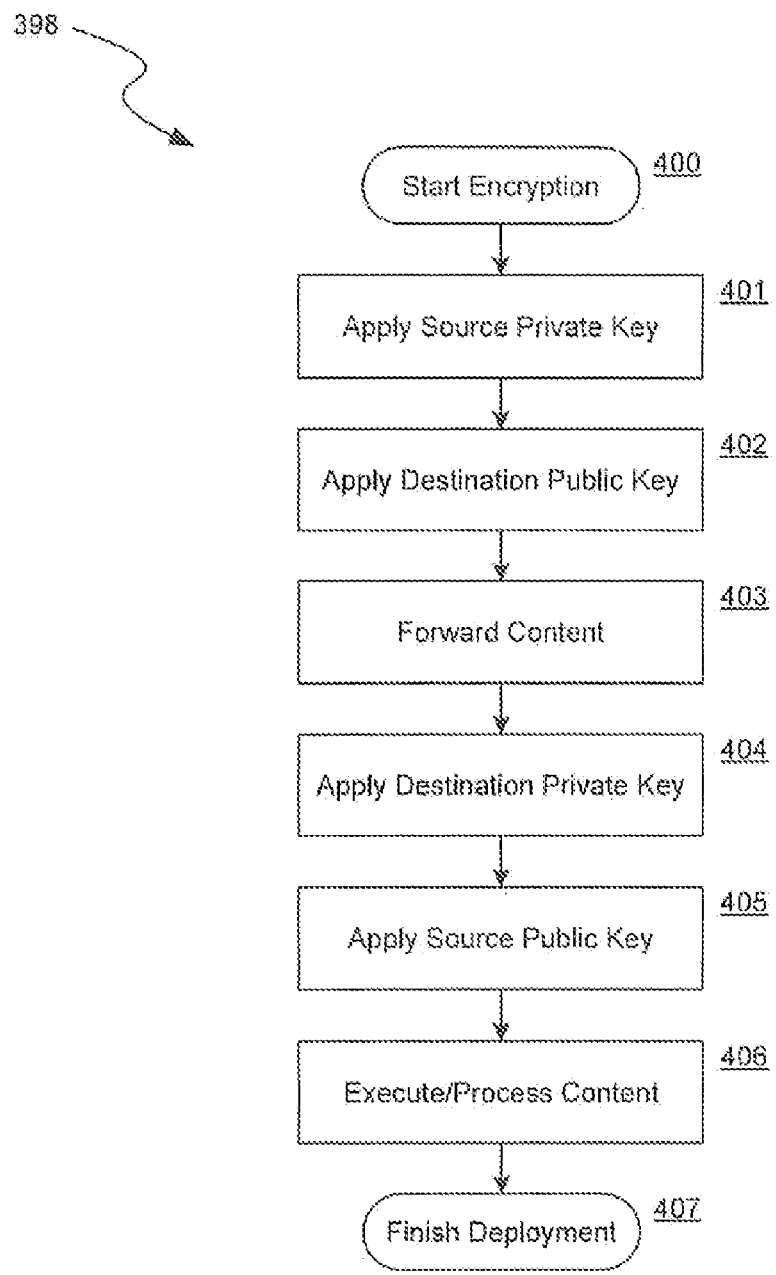
FIG. 5 is a flowchart of the encryption process between source and destination peers.

According to certain embodiments, the digital photography system of the present invention may use an encryption system as illustrated in FIG. 4 and FIG. 5 to secure communications between devices. This invention uses one such encryption system based on a public key cryptography. A public key system is useful in providing secure peer-to-peer communications between devices. Alternatively, communications between devices may not require encryption, which may be the case where the network is already secure or security is not required between two peers. In the preferred embodiment, a public key cryptography scheme is used as the software is readily available and easy to use.

Public key cryptography enables a pair of peers, each of whom has a public key and a private key to send and receive secure information. In particular, the source can verify that only the destination can interpret the information and the destination can verify that the source was the only peer who could have sent the information.

FIG. 5 is a flowchart a public key cryptography method 398 suitable for use with the present invention. The encryption begins in a start encryption step 400 where a source (computing device of some sort) within the initiate fulfillment computing environment begins the process of transferring date to the fulfillment computing environment. At step 401, the source applies its private key to the information being sent. At step 402, the source applies the destination public key to the result of step 401. The resulting encrypted information is then sent to the destination peer at step 403. At step 404, the destination applies its private key to the received information. At step 405, the destinations decrypts the information obtained from step 404 by applying the source public key to retrieve the original information.

Figure 6:
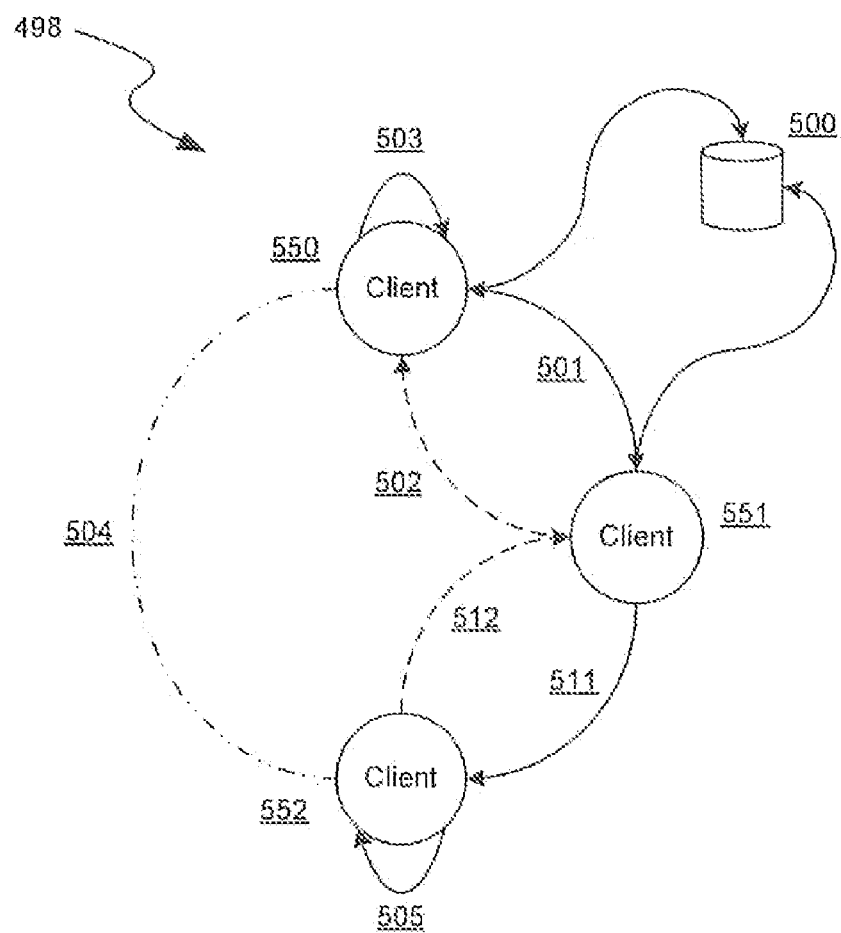
FIG. 6 is a diagram illustrating the peer-to-peer encryption using a public key cryptographic scheme.

Public key cryptography of the type described above with reference to FIG. 5 facilitates secure peer-to-peer communications. FIG. 6 illustrates the nature of peer-to-peer secured communication 498. As embodied by this implementation, if a source has a public key for a desired destination the encryption process as illustrated by link 504 is traversed. A cache 500 is implemented either as a database or in memory data store that maintains a collection of known public keys across the collection of peer devices. The cache 500 is optional and may not be required or implemented as illustrated between clients 550-552.

For illustrative purposes, a source client 550 wants to send secured information to destination client 552. However, the source client 550 does not have the public key of the destination client 552. Since clients 550, 551 and 552 form a connected peer-to-peer network, the source client 550 sends a message via link 501 to destination client 551 requesting the public key of destination client 552. Destination client 551 forwards the request to destination client 552 via link 511. The destination client 552 responds to the request for its public key to destination client 551 via link 512. The destination client 551 forwards the response to source client 550 via link 502. Having the public key for destination client 552, source client 550 can encrypt its information to destination client 552 via link 503, which embodies the steps 400 through 403 from FIG. 5. Once encrypted, source client 550 forwards the secured information to destination client 552 via link 504. When destination client 552 receives the secured information it decrypts the information via link 505, which embodies the steps 404 through 406 from FIG. 5.

As observed in this embodiment of the invention, digital image information is always secure between different peers within the computing environment, providing privacy and security to digital image content of the user 203. Furthermore, public keys can always be determined for any plurality of destination devices due to the implicit peer-to-peer broadcasting mechanism of the preferred embodiment of the invention.

Figure 7:
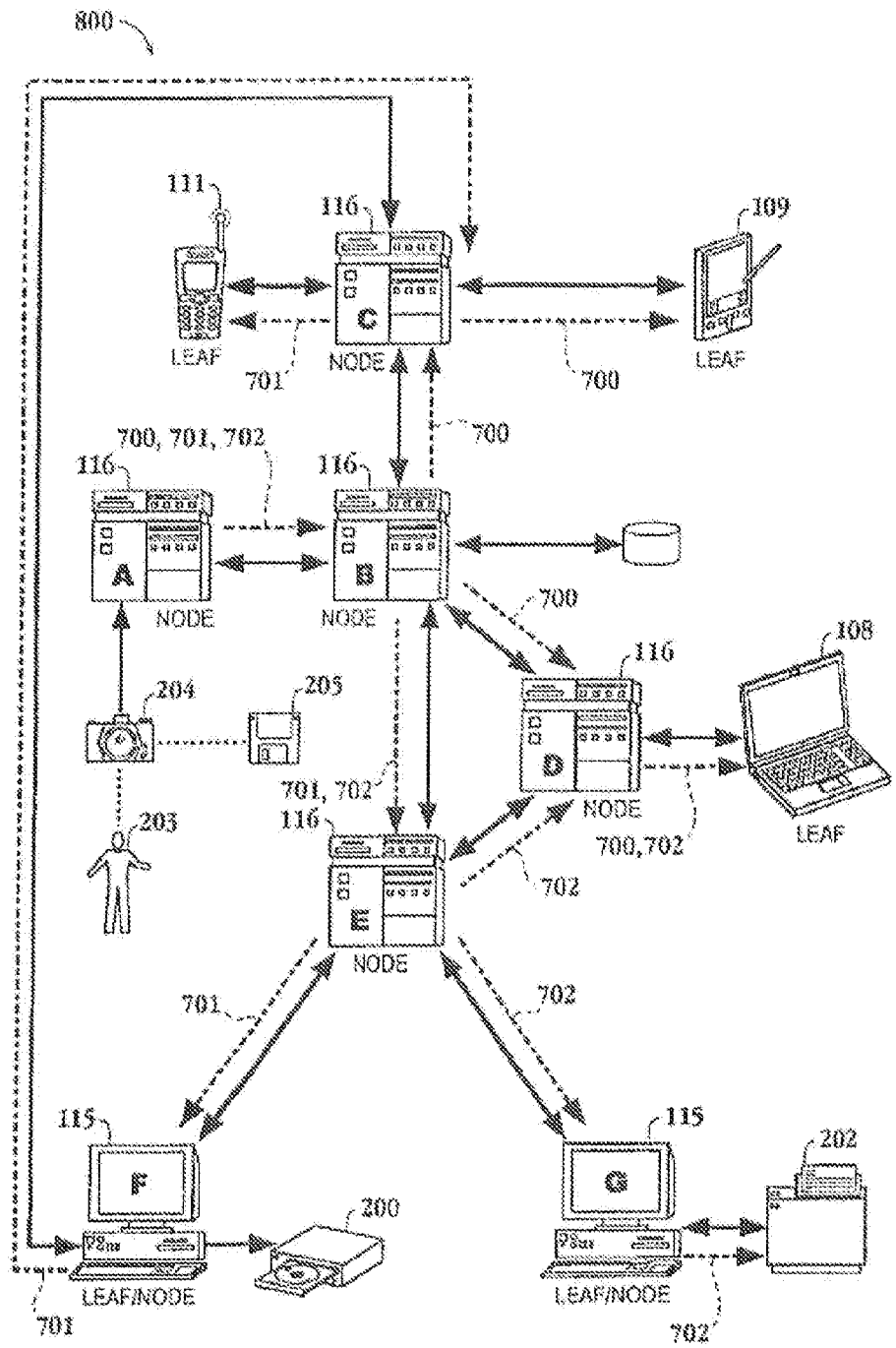
FIG. 7 is a diagram illustrating different possible use case scenarios of the architecture.

FIG. 7 illustrates a representative set of possible user case scenarios 800, of which three possible solutions are presented. In all illustrations in FIG. 7, the starting point begins with user 203 of the digital photography system, the digital camera and memory media represented by 204 and 205 respectively. These three items are referenced as the user and digital camera. There is a plurality of computing devices, some of which form nodes within a scale-free network connected by a communication system, one of which is the Internet. There is a plurality of computing devices, some of which form leafs within a scale-free network connected by a communication system, one of which is the Internet. The nodes within this architecture provide the main routing and a point of connecting leafs as source to other leafs as destination. Leafs or nodes can further augment the processing environment by providing processing behavior, some of which includes scripts, portions of programs, or execution link to other computing environments to name a few.

FIG. 7 illustrates as flow paths three scenarios labeled 700, 701 and 702. Each of these scenarios initiates from the user and the digital camera 203, 204 and 205. Computing nodes 800 through 804 are representative of the computing device labeled 116 illustrated in FIG. 1. Computing leafs/nodes 805 and 806 are representative of the computing devices 108 and 115 respectively illustrated in FIG. 1. All other computing devices are labeled the same as in earlier FIGS.; the aforementioned items are re-labeled in order to make the illustration more clear.

Scenario 700 illustrates a user of a digital camera whom desires to off-load the pictures from the digital camera into the system so that the digital media memory card 205 becomes free for further picture taking. This scenario requires the user to utilize the process illustrated in FIG. 3 and 4. Once the digital content has been off-loaded into the computing device 800, the user is detached from the system and the digital media memory card is ready to be re-used by the user 203. Node 800 serves as an intermediate staging node whereby additional behavior can execute, some of which includes storing the user's digital pictures until bandwidth becomes available across the network, or bundling the entire package of pictures along with the provisioner of FIG. 4 into a secured package for further transmission and process by other nodes within the scale-free network.

In scenario 700, the user 203 via their personal Provisioner 454 has three objectives: 1) offload the digital pictures, freeing the digital media memory card; 2) store the pictures in a secure location; 3) send a thumbnail confirmation via email; 4) send the digital photos to my preferred online web-services provider. The node 800 forwards that Provisioner and bundled digital picture content to node 801, which serves in this example as a storage repository for subscribed users.

With further reference to scenario 700, the node 801 has additional behavior which responds to the Provisioner satisfying the request to create a thumbnail email confirmation of content offload; the confirmation is independent of the transaction devices and matches the user's personalization and customization. The Provisioner 454 informs the node 801 to generate a complimentary set of thumbnail images for representing the content stored in node 801. This new content is associated with the Provisioner and both are forwarded to node 802. The Provisioner informs node 802 that email is the preferred method of confirmation. Furthermore, the Provisioner knows that the user 203 will be using a PDA as the preferred method of reading email. Node 802 extracts thumbnails from the Provisioner, formats the content into an presentation appropriate for a PDA 109 (although the FIG. also illustrates a mobile phone as one of many other possibilities). The email is sent to 109 with any other pertinent information the system wishes to offer the user 203, some of which ordering and fulfillment options, archiving and forwarding of content to name a few. Furthermore, the Provisioner 454 can be cloned to achieve parallel modes of operation. In this scenario, the Provisioner also has the objective of having the content sent to a preferred online web-services provider, which is illustrated with the link to node 803. Node 803 ties into the API of the online web-services provider, acting on behalf of the user 203. Node 108 serves as the user's browser into online web-service provider's portal whereby additional operations can be applied.

Scenario 701 follows the same steps as scenario 700, up to node 801 with the exception being the Provisioner has a different objective, namely: 1) offload the digital pictures, freeing the digital media memory card; 2) take archive fulfillment; 3) receive voice and text messaging confirmation of both order submittal and physical archive completion. Node 800 satisfies objective 1, where the content is now bundled with the Provisioner and they travel to node 804 via node 801 which serves as a router node along an edge within the scale-free network. Node 804 represents a plurality of fulfillment possibilities, which for this scenario is forwarding of the bundled Provisioner and digital content to node 805. Node 801 and 804, while having additional behaviors, are not acted upon as the Provisioner does not require their services, and therefore the nodes simply move the bundle forward to achieve the established objective. Node 805 performs two roles: 1) archiving of the digital pictures to the choice of physical archive 200 (along with proper mail labeling as prescribed by the Provisioner); 2) forwarding the Provisioner to Node 802 for special messaging to the user. Node 802 illustrates the capability for two notification devices, but the Provisioner specifies text and voice messaging as preferred methods of user confirmation. Node 802 formats the confirmation of offload as well as content archiving to physical media and forwards that message to node 111.

Scenario 702 follows the same steps as scenario 701, up to node 801 with the exception being the Provisioner has a different objective, namely: 1) offload the digital pictures, freeing the digital media memory card; 2) take physical print fulfillment; 3) add a new entry of digital pictures to the user's online web based photo album and slide show. Node 800 satisfies objective 1, where the content is now bundled with the Provisioner and they travel to node 804 via node 801 which serves nothing more than a router node along an edge within the scale-free network. Node 804 represents a plurality of fulfillment possibilities, which for this scenario is forwarding the bundled Provisioner and digital content to node 803 and 806. Node 801, while having additional behaviors, are not acted upon as the Provisioner 454 does not require their services, and therefore the node simply moves the bundle forward to achieve the established objective. Node 803 represents the interface into the online web based photo album and slide show. Node 803 is configured with the necessary information as prescribed by the Provisioner 454 to insert the digital content from the Provisioner into the online photo album. This is done on behalf of the user 203, who uses node 108 representing a web based browser to login and view the new slide show and photo album. Node 804 also clones the Provisioner (but not always the digital content itself, as these maybe proxies to offline storage where the original images are actually stored), and forwards to node 806 which represents a plurality of fulfillment devices, some of which include high end printing presses or digital photographic mini labs. Node 806 is connected to a representative printing device 202. Furthermore, node 806 contains additional behaviors which when acted upon by the Provisioner can achieve different forms of output in accordance with the capabilities of the device 202 specifics, some of which include singular photo prints or composite photo albums each having additional ornamental features as specified by the Provisioner in accordance with the capabilities of the device 202.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method for processing a digital image to satisfy a fulfillment request, comprising:
   receiving the fulfillment request to perform image processing on the digital image;
   wherein, the request is initiated by a user using a user device and the image processing results in generation of a modified digital image;
   identifying the user that initiated the request via the user device;
   generating a provisioner that determines, in an ad-hoc fashion, a set of networked computing devices that collaborate to satisfy the fulfillment request to generate the modified digital image;
   in response to identifying the user, automatically performing an instantiation process, by each of the set of networked computing devices, to perform the image processing;
   wherein each of the set of networked computing devices perform different functions in the image processing of the digital image, each mutually independent from each other.

2. The method of claim 1, further comprising, acquiring the digital image from the user device.

3. The method of claim 1,
   wherein the multiple destinations includes an online web-services provider;
   wherein, the online web-services provider includes an online album.

4. The method of claim 1, wherein the set of networked computing devices communicate via a secure connection utilizing encryption for at least a portion of the performing the instantiation process.

5. The method of claim 1, wherein the set of networked computing devices serve multiple purposes in performing one or more tasks of the performing the instantiation process.

6. The method of claim 1, wherein, the provisioner further comprises a user-customized setting specified by the identified user having a selection of multiple destinations to which the digital image is sent to satisfy the fulfillment request.

7. The method of claim 1, wherein one system component of the set of networked computing devices is a server.

8. The method of claim 1, wherein, the user device is a mobile radiotelephone.

9. A method for processing a digital image to satisfy a fulfillment request, comprising:
   receiving the fulfillment request to perform image processing on the digital image;
   wherein, the request is initiated by a user using a user device and the image processing results in generation of a modified digital image;
   identifying the user that initiated the request via the user device;
   generating a provisioner that determines, in an ad-hoc fashion, a set of networked computing devices that collaborate to satisfy the fulfillment request to generate the modified digital image;
   wherein, the provisioner further comprises a user-customized setting specified by the user having a selection of multiple destinations to which the digital image is sent to satisfy the fulfillment request;
   initiating a process whereby each of the set of computing devices participate in performing the image processing and sending the modified digital image to each of the multiple destinations;
   wherein, each of the set of networked computing devices perform different functions in the image processing of the digital image, each mutually independent from each other.

10. A method for processing a digital image to satisfy a fulfillment request, comprising:
    receiving the fulfillment request to perform image processing on the digital image;
    wherein, the fulfillment request is initiated by a user using a user device;
    identifying the user that initiated the request via the user device;
    generating a provisioner that determines, in an ad-hoc fashion, a set of networked computing devices that collaborate to perform the image processing;
    performing a process, by each of the set of networked computing devices, to perform the image processing;
    wherein, each of the set of networked computing devices perform different functions in the image processing of the digital image.

11. The method of claim 10, wherein, the process is automatically performed in response to identifying the user.

12. The method of claim 10, wherein, the image processing includes modification of the digital image.

13. The method of claim 10, wherein, the image processing includes enhancement of the digital image.

14. The method of claim 10, wherein, the image processing includes rotation of the digital image.

15. The method of claim 10, wherein, the image processing includes modifying a layout of the digital image.

16. The method of claim 10, wherein, the digital image is sent to an online web-services provider.

17. A method for processing a digital image to satisfy a fulfillment request, comprising:
- receiving the fulfillment request to perform image processing on the digital image;
- wherein, the fulfillment request is initiated by a user using a user device and the image processing results in generation of a modified digital image;
- identifying the user that initiated the request via the user device;
- generating a provisioner that determines, in an ad-hoc fashion, a set of networked computing devices that collaborate to satisfy the fulfillment request to generate the modified digital image;
- wherein, the provisioner further comprises a user-customized setting specified by the user having a selection of multiple destinations to which the digital image is sent to satisfy the fulfillment request;
- in response to identifying the user, automatically initiating a process whereby each of the set of networked computing devices participate in performing the image processing by performing different functions and sending the digital image to each of the multiple destinations.

18. A method for processing a digital image to satisfy a fulfillment request, comprising:
- receiving the fulfillment request to perform image processing on the digital image;
- wherein, the request is initiated by a user using a user device and the image processing results in generation of a modified digital image;
- identifying the user that initiated the request via the user device;
- generating a provisioner that determines, in an ad-hoc fashion, a set of networked computing devices that collaborate to satisfy the fulfillment request to generate the modified digital image;
- automatically initiating a process whereby each of the set of computing devices participate in performing the image processing to generate the modified digital image;
- wherein, each of the set of networked computing devices perform different functions in the image processing of the digital image.

* * * * *

UNITED STATES PATENT AND TRADEMARK OFFICE
CERTIFICATE OF CORRECTION

PATENT NO.       : 7,610,207 B2
APPLICATION NO. : 10/733830
DATED            : October 27, 2009
INVENTOR(S)      : Douglas B. Heins It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 721 days.

Signed and Sealed this

Twelfth Day of October, 2010

David J. Kappos
*Director of the United States Patent and Trademark Office*